INVENTORS
Arno Geyer and Rolf Westenberger

June 30, 1964   A. GEYER ETAL   3,139,001
RELIEVING SHAPER

Filed Aug. 18, 1960   10 Sheets-Sheet 5

INVENTORS
Arno Geyer and Rolf Westenberger
BY
Dicke, Craig & Freudenberg
ATTORNEYS June 30, 1964  A. GEYER ETAL  3,139,001
RELIEVING SHAPER
Filed Aug. 18, 1960  10 Sheets-Sheet 6

INVENTORS
Arno Geyer and Rolf Westenberger
BY
ATTORNEYS

INVENTORS
Arno Geyer and Rolf Westenberger
ATTORNEYS

Fig. 20

INVENTORS
Arno Geyer and Rolf Westenberger 3,139,001
RELIEVING SHAPER
Arno Geyer, Geislingen, Wurttemberg, and Rolf Westenberger, Neu-Ulm, Bavaria, Germany, assignors to J. E. Reinecker Maschinenbau G.m.b.H., Wurttemberg, Germany
Filed Aug. 18, 1960, Ser. No. 50,469
Claims priority, application Germany Sept. 1, 1959
23 Claims. (Cl. 90—38)

The present invention relates to a new method of relieving and to a shaping or slotting machine for carrying out this method.

There are numerous rotary parts required in industry which have to have individual surfaces of a curved shape which deviate from the outer circular peripheral direction of the part and possibly also from the axial direction thereof. Such parts are especially used as hobs, milling cutters, and other types of cutters on machine tools. In the past they could only be made by relieving on a relieving lathe, a relief milling machine, or a relief grinding machine which required a considerable length of time and involved great expense.

It is an object of the present invention to provide a new method of relieving which is much more economical and also more accurate than the conventional relieving methods.

A further object of the invention is to provide a relief shaping or slotting machine, hereafter called a relieving shaper, for carrying out the aforementioned new method.

This new method broadly consists in reciprocating a suitable cutting tool in a straight direction within a plane extending vertically or at an oblique angle to the rotary axis of the workpiece, so that the cutting tool during its movement in one direction will thus carry out cutting operations on the workpiece, while the workpiece rotates about its axis at least during a part of the cutting operation. The movement of the cutting tool of this machine is therefore similar to that of the cutting tool of a conventional planing, slotting, or shaping machine, which is the reason why the new machine has been called a relieving shaper, although it differs in many respects from a conventional shaper.

The new relieving method according to the invention is preferably carried out by first plunge-cutting a rectangular recess into a blank of a circular cross section which during this operation is held in a stationary position. This plunge cut is made by feeding the reciprocating shaping tool into the workpiece to a depth corresponding to the deepest point of the curved surface to be formed. Thereafter the workpiece is slowly rotated in the direction toward the cutting tool which, while continuing its reciprocating motion, is gradually retracted. By varying this retracting motion, different kinds of curved surfaces may be produced. If at the same time the workpiece is also moved in its axial direction and the cutting tool is set at a suitable angle, a helical curve may be formed, as required, for example, for producing hobs.

From the above description it is evident that the speed at which the shaping tool is retracted is dependent upon the angular speed of the workpiece. Since the tool support does not have to be repeatedly moved back and forth in a direction parallel to the workpiece axis as is necessary when operating on a relieving lathe, but since the full width of a milling cutter or of each individual helical tooth of a hob is finished in one continuous operation, it is obvious that the entire cutting operation proceeds much more quickly according to the new method than according to the conventional methods. The operating speed of the reciprocating shaping tool is also much higher than that of the tool of a relieving lathe. Therefore, a milling cutter may be produced according to the invention in a fraction of the time which was previously required. Furthermore, the degree of accuracy which is attainable is also greater than that attainable on a relieving lathe since the higher cutting speed of the shaping tool results in a smoother and more accurate cutting operation. The relief-shaping method according to the invention is also superior to the relief-milling method since, for example, when producing a milling cutter, the diameter of the relieving cutter depends upon the depth of the relief and the width of the longitudinal grooves. If this depth and width should exceed a certain amount, the diameter of the required relieving cutter will be so small that only a very slow feed can be used which renders the operation very uneconomical. Also, because of the possible bending of such a small relieving cutter, especially when attempting to work with a greater feeding speed, it is not possible to attain a very smooth and accurate curved surface. All of these disadvantages of the conventional relieving methods will be avoided by the relief-shaping method according to the invention.

The shaping tool to be used in the new method depends upon the shape of the workpiece to be produced. Thus, for example, for disk-shaped milling cutters with backed-off teeth, a shaping tool with a straight cutting edge is used, whereas for producing curved surfaces which also have a curvature in the longitudinal direction of the cutter, for example, a helical hob, the shaping tool will be designed in accordance with the cross-sectional shape of the helix. The method according to the invention is, however, not limited to the production of milling cutters, but may be applied with the same advantages to the production of any other objects which should be provided with a convex curved surface, as seen in a cross section transverse to the rotary axis of the object, or with a surface which is also curved in the longitudinal direction of the object. A plurality of such curved surfaces may also be provided peripherally of such an object and the individual curves may also be made of different cross-sectional shapes. It is even possible to shape straight surfaces on the periphery of a workpiece.

The machine, i.e., the relieving shaper, according to the present invention is designed so as to be applicable as universally as possible for producing various types of curved surfaces on different types of workpieces. In accordance with the new relieving method as previously described, the workpiece is rotated on this machine about its axis, while the reciprocating shaping tool is gradually retracted at the same time to increase its distance from the axis of the workpiece. Since the relieving operation is started at the deepest point of the curve, the workpiece is at first held in a stationary position, and the reciprocating shaping tool is advanced until it has cut away the material to the deepest desired point. For producing, for example, a disk-shaped milling cutter or a cutter with straight or helical grooves, the relieving shaper is operated in such a manner that at first a number of longitudinal grooves are milled into the blank in accordance with the number of curved surfaces to be shaped and extending either radially or helically of the blank. Thereafter, that part of the workpiece which is adjacent to each groove at one side thereof is cut off by a plunge-cutting operation of the reciprocating shaping tool to the deepest point of the curve while the workpiece is held in a stationary position, and thereupon the actual relief shaping is started until the highest point of the curve is reached. Thereupon the workpiece is further rotated to the position where the next plunge-cutting operation is to be carried out which is followed by the next relief-shaping operation.

The shaping unit of the machine consists of a housing on which the shaping tool is slidably mounted so as to permit it to reciprocate upwardly and downwardly. The housing further contains the elements for driving the shaping tool. The shaping unit is mounted on two slides which consist of a lower slide for the continuous retracting movement during the relief-shaping operation and an upper slide for the hydraulic quick-return traverse and the plunge-cutting operation. Thus, there are two separate driving movements, namely, one for the plunge-cutting operation and the other for thereafter carrying out the relief-shaping operation.

For carrying out these different movements, the lower slide carries in a stationary bearing a slowly rotating cam plate which acts upon a stop member on the lower slide and is adapted to move the latter either uniformly or in a varying motion, depending upon the particular shape of the cam plate. The upper slide which carries the shaping unit and follows the movement of the lower slide during the relief-shaping operation contains the elements for moving this slide independently of the lower slide so as to carry out the hydraulic quick-return traverse and the plunge-cutting operation. These elements consist of a hydraulic piston and gears which are driven by said piston.

The double slide which carries the shaping unit may be revolved within a horizontal plane on a base plate. The shaping unit itself is additionally adjustable within a horizontal plane on the upper slide. The means for guiding the shaping tool during its vertical reciprocating movement along the shaping unit is adjustable on the latter within a vertical plane. As already mentioned, due to the rotation of the cam plate, the double slide moves during the relief-shaping operation in a direction away from the slowly rotating workpiece, while at the same time the shaping tool reciprocates rapidly in a vertical direction.

In view of its weight and inertia, it is not possible to move the shaping unit during the quick-return traverse of the work slide in synchronism with the cam plate. This quick-return traverse of the work slide is, however, required in the event that it becomes necessary to carry out a second shaping operation with a very fine cut for finishing a helically shaped workpiece. It was therefore necessary to design a special mechanism which permits the spiral groove again to be placed into exact coincidence with the shaping tool after the quick-return of the work slide has been completed and when the finishing operation of the shaping tool is to be started. This is accomplished according to the invention by reversing the motion of the entire driving-gear mechanisms during the quick-return traverse and by stopping the lower slide by hydraulically withdrawing it so far from the cam plate that the latter will turn freely. For again reversing the movement of the lower slide for the finishing operation, the same is hydraulically controlled by a solenoid-operated slide valve so that its control pin will engage under a hydraulic pressure against the slowly rotating cam plate and will then continue to follow its movement. During this time, the gears for driving the main spindle, the lead spindle, the workpiece, and the cam plate remain in engagement both during the slow retracting and the quick-return movement so that no change in the gear positions can occur. This insures that whenever the slow-retracting or quick-return movement is switched on, each groove in the work-piece will properly coincide with the position of the shaping tool. Since the lower slide is pressed hydraulically against the cam plate, there is also no danger of any play.

In order to insure a proper cut, the vertically reciprocating slide which carries the shaping tool and is guided along the shaping unit is provided with a resilient hinged flap on which the shaping tool is mounted and which is adapted to be pivoted about an axis which extends parallel to the plane of movement of the slide and at a right angle to the direction of its movement and that of the shaping tool thereon, so that during the non-cutting movement, the tool will be pivoted slightly away from the workpiece so as not to engage with the surface previously cut.

In order to permit a more economical operation on workpieces with curves of a very strongly sloping shape, for example, wood-milling cutters, the machine according to the invention is also combined with a milling unit. This milling unit is also mounted on the housing of the shaping unit and driven by the driving elements of the latter. In order to bring the milling unit into the proper position relative to the workpiece, the entire shaping unit may be turned 180° on the double slide about a vertical axis so as to reverse the positions of the shaping and milling cutters. The operation of the milling unit occurs in substantially the same manner as that of the shaping unit, except that the cutting movement is circular rather than reciprocatory. Also in this case, a groove is first plunge-milled into the workpiece to the deepest point of the intended curve while the workpiece is held in a stationary position, and thereupon the curve is milled by the milling cutter from this point to the highest point by gradually withdrawing the milling cutter while the workpiece at the same time is slowly rotated. After one tooth has thus been finished, the rotation of the workpiece is stopped and the next plunge-cut is made, whereupon the rotation is again started and the milling cutter gradually withdrawn in accordance with the desired curve until the next tooth is completed.

The above-mentioned as well as additional objects, features, and advantages of the present invention will become further apparent from the following detailed description thereof which is to be read with reference to the accompanying drawings, in which—

FIGURE 19 shows a gear diagram of the machine; while

Figure 1:
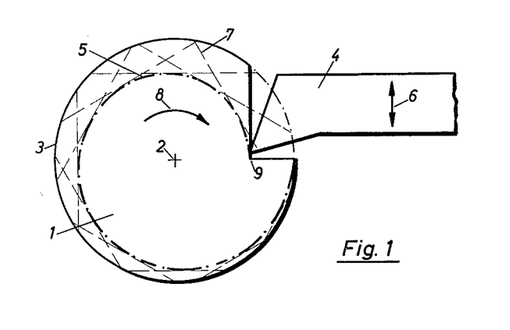
FIGURES 1 to 3 show diagrammatical illustrations of the principles of the relieving method according to the invention.
Figure 2:
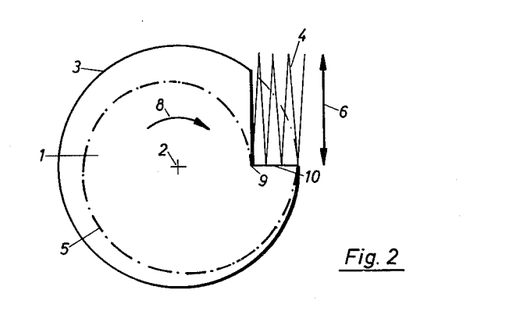
Figure 3:
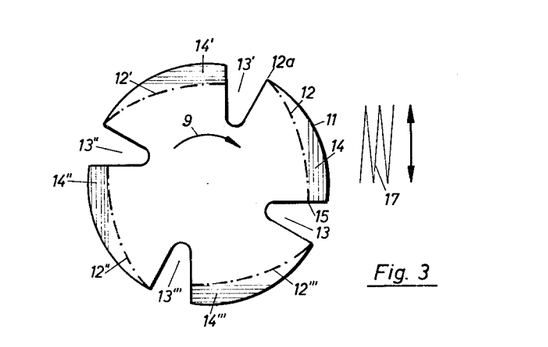

Referring to the drawings, and first particularly to FIGURES 1 to 3 thereof which illustrate the principles of the new relieving method and also of the manner of operation of the new relieving shaper, FIGURES 1 and 2 show a workpiece 1 as seen in an end view thereof. The outer peripheral surface 3 of this workpiece is to be relieved in the peripheral direction thereof by the cutting tool 4 so as to form one or more curved surfaces 5 which are gradually relieved in a direction away from the axis 2. This curved shape is produced by tool 4 which reciprocates in a direction 6 and always moves in a tangential direction 7 relative to the peripheral surface of workpiece 1 since the latter is slowly rotated in a clockwise direction 8. This dual movement of the cutting tool and of the workpiece is hereafter called relief shaping.

The relief shaping operation is started at the point of the intended curve which forms either the beginning or the end thereof and is spaced at the smallest radial distance from axis 2. Depending upon the desired shape of curve 5 this distance is thereafter gradually increased by a retracting movement of cutting tool 4 relative to the axis 2 of workpiece 1 at a uniform speed or at a uniform or varying acceleration. Thus, for example, if this retracting speed remains uniform, an Archimedean spiral would be formed. As already indicated, during the relief shaping, that is, during the time when the distance between the cutting tool and the axis of the workpiece is being increased, workpiece 1 is turned at a low speed about its axis. This speed may, however, also be varied to vary the shape of the desired curve.

The workpiece generally consists of a blank of a substantially circular cross section. It may, however, also have a different cross-sectional shape, provided that it possesses a sufficient wall thickness to permit the desired curved shape of its outer surfaces to be attained.

Since according to the invention the relief shaping operation is preferably started at the deepest point 9 of curve 5, this deepest point is produced by first feeding the reciprocating cutting tool 4 in a straight direction toward the workpiece while the latter is held in a stationary position until cutting tool 4 has planed off the requisite amount material of the workpiece so that the deepest point 9 of the subsequent curve 5 is reached.

In FIGURE 2, the zig-zag lines 4 indicate the reciprocating movement of the shaping tool, while cutting a rectangular recess 10 into the workpiece 1 to the deepest point 9 of the subsequently shaped curve 5 while workpiece 1 is held in a stationary position. This operation is called the plunge-cutting operation and the rectangular cut 10 so produced thereby is called the plunge-cut. After this plunge-cut has been completed, workpiece 1 is slowly rotated in the direction of arrow 8. The shaping tool 4 which reciprocates continuously then continues its cutting operation and is at the same time gradually retracted so that, as the result of the rotary movement of the workpiece in combination with the gradual retraction of the shaping tool 4, curve 5 will be formed.

FIGURE 3 illustrates the production of a disk-shaped milling cutter or of one with straight or helical grooves which is machined from a blank 11 of a circular cross section. Assuming that four curved surfaces 12, 12′, 12″, and 12‴ are to be produced which are uniformly distributed along the periphery of the workpiece, four equally spaced radial grooves 13, 13′ 13″, and 13‴ are first milled into blank 11. These grooves 13 may extend either in a straight or helical direction of the blank, depending upon the type of milling cutter to be produced. Thereafter, the relief-shaping operation according to the invention is started by first removing the portion 14 adjacent to the first groove 13 by the mentioned plunge-cutting operation. Of course, each of these cuts should be made in a tangential direction of curves 12 so as to remove the greatest amount of material by this relatively quick operation. After the deepest point 15 of the first curve 12 has been reached, the relief-shaping operation is started by slowly rotating the workpiece 11 in the direction 16 and by gradually retracting the reciprocating shaping tool, as indicated by the zig-zag lines 17 so that the first curve 12 will be formed. The speed of rotation of workpiece 11 is coordinated with the retracting movement of the shaping tool so that the particular desired shape of curve 12 will be attained.

Figure 4:
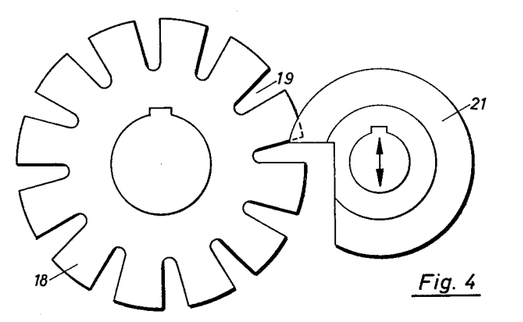
FIGURE 4 shows an end view of a workpiece, for example, a hob with helically shaped grooves and of a substantially circular cutting tool which is preferably used according to the invention for the shaping operation.
Figure 5:
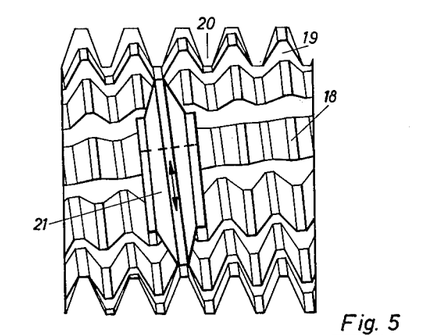
FIGURE 5 shows an elevation taken at right angles to FIGURE 4.

When the relief-shaping operation on the first curve 12 had been completed at the highest point 12a thereof, the retracting movement of the shaping tool is stopped, but the workpiece 11 continues its rotary movement until it is in the proper position for the next plunge-cutting operation above groove 13′. After the next plunge-cut 14′ has been made, the following curve 12′ is produced by relief-shaping, as previously described. The same operations are then repeated to produce the last two curves 12″ and 12‴. In the same manner it is possible to provide any other desired number of curved surfaces 12 along the periphery of a workpiece. FIGURES 4 and 5 illustrate a hob 18 with milled longitudinal grooves 19 and helical grooves 20 which is preferably produced by means of a disk-shaped shaping tool 21.

Figure 6:
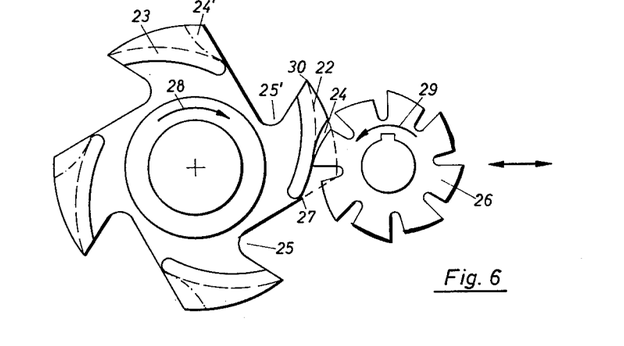
FIGURE 6 shows the principle of operation of the relief-milling unit of the new machine.

As previously stated, the relieving shaper according to the invention may also be combined with a milling unit for milling very strongly sloped curves still more economically, for example, for producing wood-milling cutters. The operation of this milling unit which will be later described in detail is very similar to that of the shaping unit, except that the cutting movement is circular rather than reciprocatory. As illustrated in FIGURE 6, for each curve 22 to be cut in workpiece 23 a plunge cut 24 is first made above groove 25 by the milling cutter 26 down to the deepest point 27 of the curve while workpiece 23 is held in a stationary position. Thereafter, the relieving operation is started by rotating workpiece 23 and gradually retracting milling cutter 26 until curve 22 is completed. As indicated by arrows 28 and 29, workpiece 23 and milling cutter 26 are rotated in opposite directions toward each other. After the first curve 22 has been completed at the highest point 30 thereof, the retracting movement of the milling cutter 26 is interrupted while workpiece 23 continues rotating until the next groove 25′ is in the proper position for the next plunge-milling operation. Thereupon the same operation as stated above is repeated until all teeth have been finished.

Figure 7:
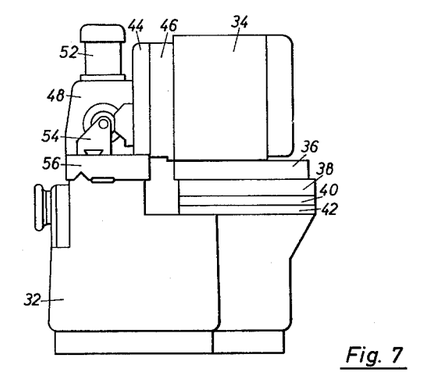
FIGURE 7 shows a side view of the machine.
Figure 8:
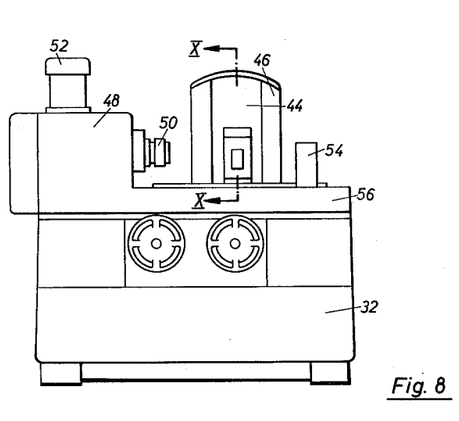
FIGURE 8 shows a front view of the machine.
Figure 9:
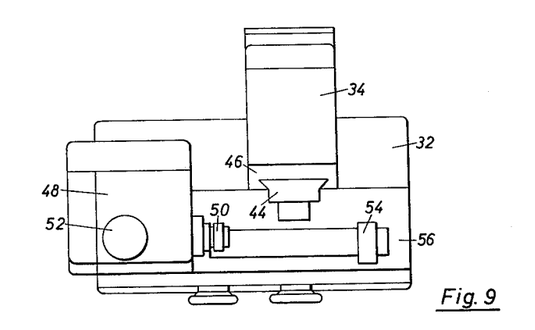
FIGURE 9 shows a top plan view of the machine.

As illustrated in FIGURES 7 to 9, the relieving shaper according to the invention consists of a frame 32 with the shaping unit 34 thereon which is mounted on a double slide 36, 38, the upper and lower slides of which are movable in the same direction. Shaping unit 34 is also rotatably adjusted on the upper slide 36 about a vertical axis and adapted to be locked in the adjusted position. Double slide 36, 38 is likewise rotatable about a vertical axis by means of a swivel plate 40 and adapted to be locked in the adjusted position on a base plate 42 which is rigidly secured to frame 32 of the machine. Shaping unit 34 has slidably guided thereon a tool support 44 which is adapted to reciprocate in a vertical direction along a guide member 46 which is rotatably adjustable in a vertical plane to the axis of and around the crankshaft 60 and to be secured in the adjusted position to one end wall of housing 58 by bolts 47. A housing 48 rotatably supports a work spindle 50 which is driven by a motor 52 and is adapted to support a workpiece either alone or together with a backrest 54. Backrest 54 and housing 48 are mounted on a work slide 56 which may be adjusted on machine frame 32 in a direction transverse to shaping unit 34.

Figure 10:
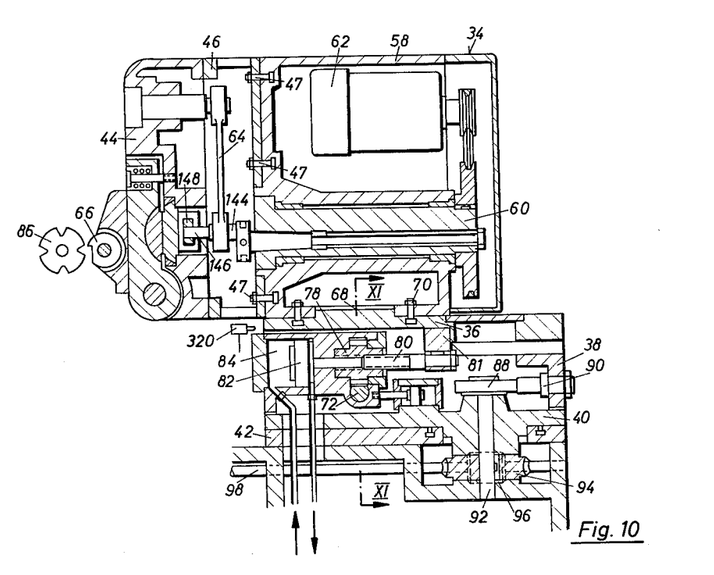
FIGURE 10 shows a longitudinal section taken along line X—X of FIGURE 8.
Figure 11:
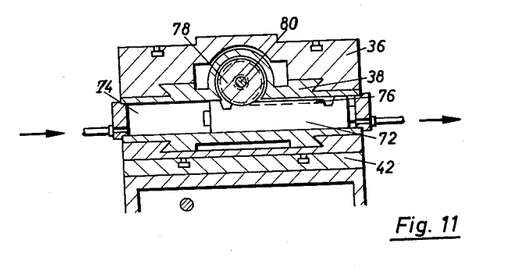
FIGURE 11 shows a cross section taken along line XI—XI of FIGURE 10.
Figure 12:
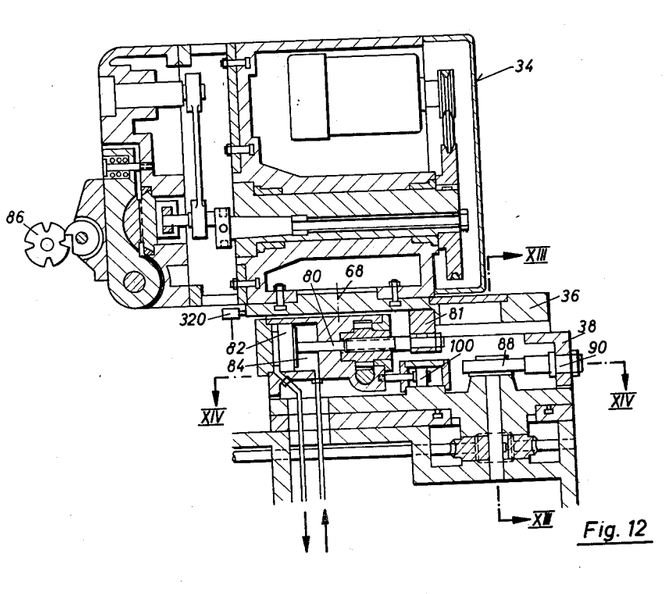
FIGURE 12 shows a longitudinal section similar to FIGURE 10, but in another position during the operation of the machine.

As shown particularly in FIGURES 10 and 12, housing 58 of shaping unit 34 has a crankshaft 60 rotatably mounted therein which is driven by a motor 62 and is adapted to reciprocate tool support 44 in a vertical direction by a connecting rod 64 and within guide member 46 on housing 58. Tool support 44 supports the shaping tool 66 which is preferably of a disklike shape, as also shown in FIGURE 4. Shaping unit 34 is rotatable about an axis 68 and is adapted to be secured by bolts 70 to the upper slide 36 which is slidable along the lower slide 38 by a hydraulic piston 72 which is slidable within a cylinder 74 and the central part of which forms a gear rack 76, as shown particularly in FIGURE 11, which is in mesh with a gear 78 with inner screw threads into which a worm spindle 80 is screwed which is axially slidable but nonrotatable and is rigidly secured at one end in a bearing 81 which is secured to the upper slide 36. On the other end of spindle 80 a piston 82 is secured which is slidable in a cylinder 84 when gear 78 is rotated by rack 76. The upper slide 36 with shaping unit 34 thereon is thus adapted to be reciprocated on the lower slide 38 during the retracting movement and for the purpose of the plunge-cutting operation. For retracting shaping tool 66 from the workpiece 86 during the relief-shaping operation, the lower slide 38 which carries the upper slide 36 and shaping unit 34 thereon is slidable with the latter along base plate 42 by means of a cam plate 88 which engages with a control pin 90 which is rigidly although removably secured to slide 38. Depending upon the particular shape of cam plate 88, the lower slide 38 together with the upper slide 36 and shaping unit 34 with shaping tool 66 thereon may thus be retracted from workpiece 86 either with a uniform or a varying speed for shaping either an Archimedean or a logarithmic spiral. Cam plate 88 is mounted on a shaft 92 which is rotatable in base plate 42 and swivel plate 40 and carries a worm gear 94 which is in mesh with a worm 96 on a shaft 98 which is driven by means which will be described later in detail, so as to drive cam plate 88 at the required speed.

Figure 13:
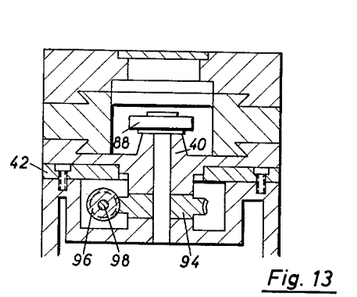
FIGURE 13 shows a cross section taken along line XIII—XIII of FIGURE 12.
Figure 14:
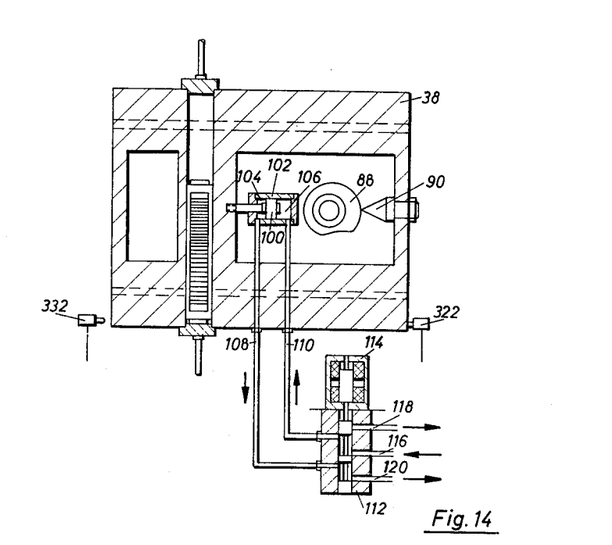
FIGURE 14 shows a cross section taken along line XIV—XIV of FIGURE 12.

As previously described, it becomes sometimes necessary, for example, in order to carry out a second shaping operation on the same workpiece for finishing it, to bring the shaping tool after the quick-return traverse of the machine again into exact coincidence with its previous position relative to the workpiece, for example, with a helical groove on a hob which has previously been shaped. For this purpose, the entire gear-driving mechanism of the machine for the movement of shaping unit 34 will be reversed during the quick-return traverse, and for stopping the upper slide 36, this slide is retracted hydraulically to such an extent from cam plate 88 that the latter can rotate freely. The means for attaining this are illustrated especially in FIGURES 12 to 14. The upper slide 36 is hydraulically connected through piston 82 with the lower slide 38 on which a piston 100 is secured which is slidable in a cylinder 102, chambers 104 and 106 of which are connected by conduits 108 and 110 to a slide valve 112 which is controlled by a solenoid 114 to connect cylinder 102 either to an oil-pressure line 116 or to pressure-release lines 118, 120. If the left chamber 104 of cylinder 102 is placed under pressure, the lower slide 38 will be shifted toward the right so that control pin 90 will disengage from cam plate 88, whereas when slide valve 112 is operated when changing from the quick-return traverse to the relief-shaping operation, the right cylinder chamber 106 is placed under pressure so that control pin 90 will again engage with cam plate 88.

Figure 15:
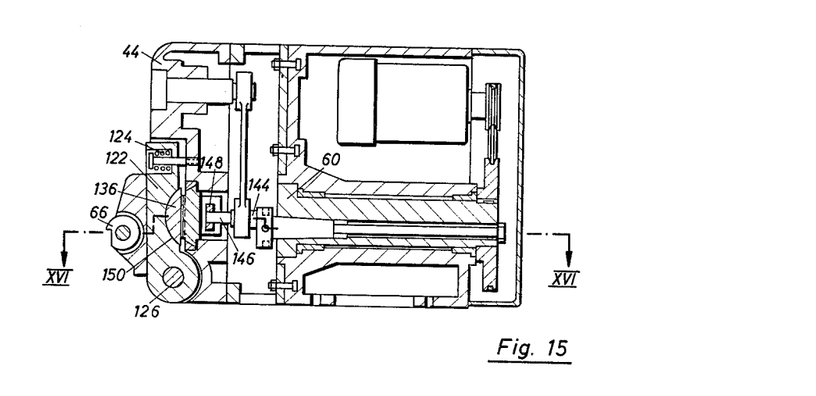
FIGURE 15 shows a longitudinal section also taken along line X—X of FIGURE 8 of the shaping unit alone in still another position of its operation.
Figure 16:
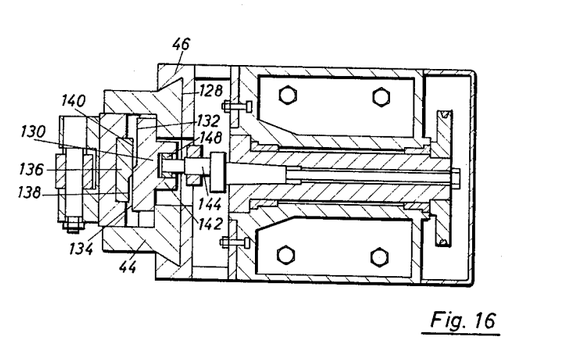
FIGURE 16 shows a cross section taken along line XVI—XVI of FIGURE 15.

FIGURES 15 and 16 show the particular arrangement of the tool support 44 and the driving means thereof, and of the means for pivoting the shaping tool 66 backwardly during its return stroke. Shaping tool 66 is secured to a hinged flap 122 which is pivotable against the action of a coil spring 124 about a hinge pin 126 which extends at a right angle to crankshaft 60 and parallel to the plane 128 of the slideway of guide member 46. This pivoting movement is produced by a slide member 130 with two steps 132 and 134 which extends parallel to plane 128 and is slidable in a direction parallel to hinge pin 126. This slide member engages with a member 136 with corresponding steps 138 and 140 on flap 122. The passage from one step to another on each member 130 and 134 is tapered so that member 130 may be easily shifted laterally from a position in which steps 134 and 138 are in engagement with each other to the position as shown in FIGURE 16 in which step 134 is in engagement with step 140 and member 136 is thus pushed forwardly against the action of spring 124. Slide member 130 has a hub 142 which is movable within a horizontal slot 144 in tool support 44 in a direction parallel to hinge pin 126. The crankpin 144 of crankshaft 60 has an extension 146 which carries a bearing member 148 which is inserted into hub 142, so that during one half-revolution of crankshaft 60 which produces the downward cutting stroke of tool support 44, flap 122 with the shaping tool 66 thereon will be pivoted outwardly, while during the second half-revolution of crankshaft 60 which produces the return stroke of tool support 44, and when slide member 130 is shifted back to its position in which both steps thereon are in engagement with both steps of member 136, spring 124 will press the hinged flap 122 back to its normal position so that shaping tool 66 can then move upwardly without engaging with the surface which it has cut during its previous downward stroke. In order to insure that the stepped member 136 will not be affected by the pivoting movement of flap 122 but will at all times flatly engage with slide member 130, it is made of an arcuate cross section so as to be pivotable within a corresponding arcuate recess 150 in the rear surface of flap 122.

Figure 17:
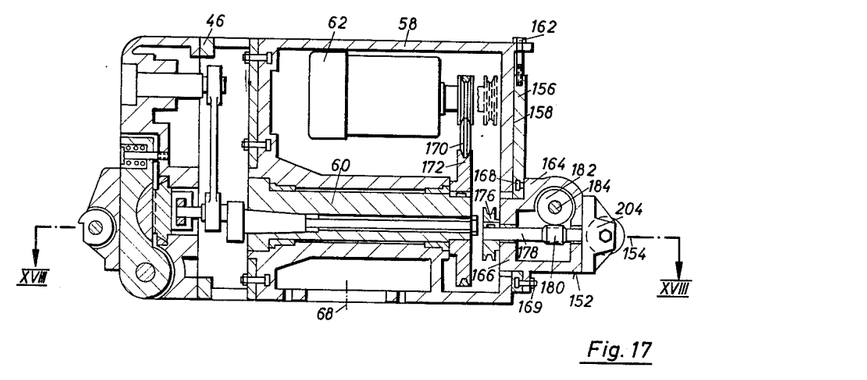
FIGURE 17 shows a longitudinal section similar to the upper part of FIGURE 10, but of a modification of the invention, in which the relieving shaper is combined with a relief-milling attachment.
Figure 18:
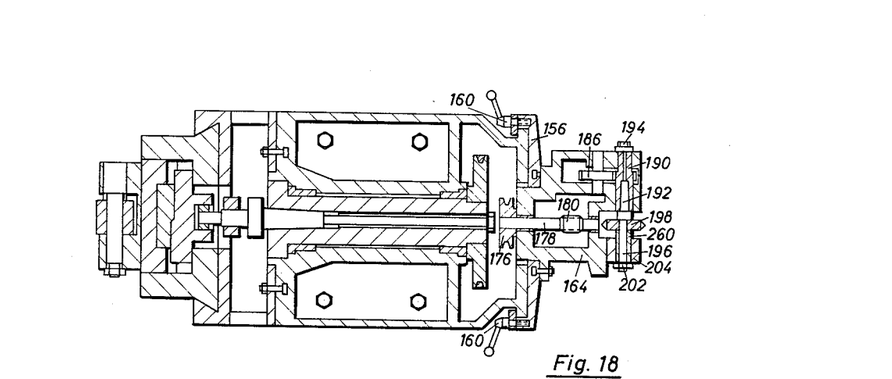
FIGURE 18 shows a cross section taken along line XVIII—XVIII of FIGURE 17.

FIGURES 17 and 18 show a modification of the machine according to the invention which permits the shaping unit 34 to be quickly exchanged for a milling unit 152 which may be used, for example, for the purpose of milling the longitudinal grooves 13, 18, or 25 into the blank of a milling cutter, as shown in FIGURES 3 to 6, or for milling the curved surfaces 22 of a workpiece in the manner as described with reference to FIGURE 6 by a method very similar to the relief-shaping method of shaping unit 34.

This milling unit 152 is mounted on the end of housing 58 opposite to the wall carrying guide member 46 and is adapted to be adjusted in a vertical direction and also to different angular positions about its horizontal axis 154. For this purpose, a slide plate 156 is connected to the end wall 158 of housing 58 and is adapted to be locked thereto by clamping bolts 160 and, when bolts 160 are loosened, to be adjusted to a limited extent in a vertical direction by one or more bolts 162. The housing 164 of the milling unit has a circular hub portion 166 which is rotatable within a corresponding aperture in slide plate 156 and is adapted to be secured in different rotary positions by bolts 169 in an arcuate slideway 168 in slide plate 156.

For driving the milling unit, motor 62 is mounted on housing 58 so as to be adjustable in its axial direction by suitable means, not shown, so that, after V-belt 170 has been taken off pulley 172 on crankshaft 60, motor 62 may be shifted so that its drive pulley 174 will be in line with a pulley 176 on a shaft 178 which is rotatably mounted in housing 164, whereupon V-belt 170 or another belt of a suitable size may be placed on pulleys 174 and 176. Shaft 178 carries a worm 180 which is in mesh with a worm gear 182 on a shaft 184 which is mounted in housing 164 and also carries a gear, not shown, which is in mesh with a gear 186 which, in turn, engages with and drives a gear rim 188 on the milling shaft 190. Milling shaft 190 is provided with an inner Morse cone 192 in which by means of a tension bolt 194 the mandrel 196 is secured on which the milling cutter 198 is secured by means of a sleeve 200 and a nut 202. Sleeve 200 is mounted in a bearing 204 which is adjustable in the axial direction of mandrel 196 and removably secured to housing 164.

In order to place milling unit 152 into the proper position relative to the workpiece which is mounted in work spindle 50, the entire housing 58 is turned 180° about its vertical axis 68 so that milling cutter 198 will be in the position previously assumed by shaping tool 66. The operation of milling unit 152 has been previously described in connection with the milling method according to the invention. For milling longitudinal grooves, for example, in a hob, the entire milling unit is turned 90° about the axis 154.

Figure 19:
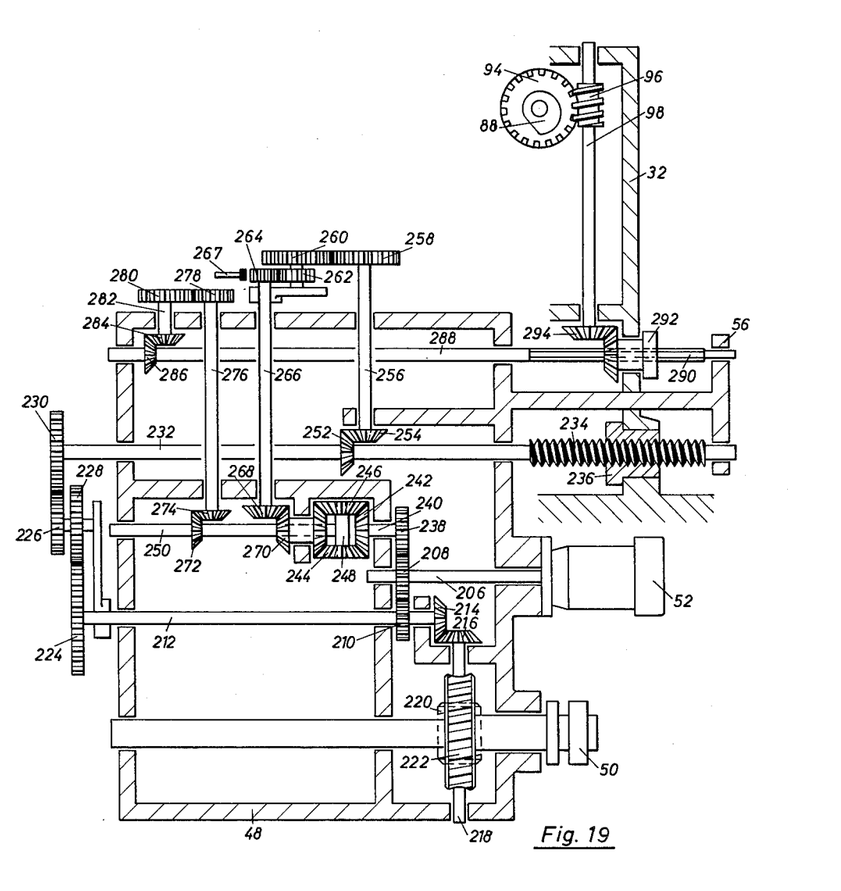

FIGURE 19 illustrates diagrammatically the gear system of the machine. The main drive is produced by motor 52 which drives the shaft 206 on which a gear 208 engages with a gear 210 on a shaft 212 which carries at one end a bevel gear 214 which is in mesh with a bevel gear 216 on a shaft 218 with a worm 220 thereon which engages with a worm gear 222 on the work spindle 50. Shaft 212 is also connected through change gears 224, 226, 228, and 230 directly with the lead-spindle shaft 232. Thus, by selecting suitable change gears, lead spindle 234 will be rotated at a certain speed in relation to the speed of work spindle 50. Nut 236 on lead spindle 234 is secured to frame 32 of the machine so that slide 56 carrying housing 48 will be shifted relative to frame 32. Shaft 206 also drives by its gear 208 a gear 238 on a shaft 240 which carries a bevel gear 242 which drives a pair of bevel gears 244, 246 on a cross shaft 248 which is secured to shaft 250.

Lead-spindle shaft 232 also carries a bevel gear 252 which is in mesh with a bevel gear 254 on a shaft 256 which is connected by differential change gears 258, 260, 262, and 264 with shaft 266 which carries a bevel gear 268 which is in mesh with a double bevel gear 270. By a suitable selection of differential change gears 258, 260, 262, and 264, it is thus possible to increase or decrease the speed of bevel gears 244 and 246 so that cross shaft 248 on shaft 250 will be accelerated or decelerated. Since shaft 250 drives cam plate 88 in a manner as subsequently described, it is possible in accordance with the selected differential change gears to give cam plate 88 an accelerating or decelerating movement which is in a particular relation to the feed of lead spindle 234 and to the speed of the main spindle 50. In this manner it is possible to machine workpieces with helical chip grooves. If workpieces with straight chip grooves are to be machined, change gears 258, 260, 262, and 264 are disengaged from each other, and shaft 266 is clamped, for example, by means of a locking member 267 which engages into gear 264 so as not to be movable. The drive is then exerted directly upon shaft 250 through bevel gears 244 and 246 rolling around the double bevel gear 270. Shaft 250 then drives through bevel gears 272 and 274 a shaft 276 which, through change gears 278 and 280, drives a shaft 282 which, through bevel gears 284 and 286, drives a shaft 288. By means of its splines 290, shaft 288 drives a bevel gear 292 which is rotatably mounted on frame 32 of the machine and drives a bevel gear 294 on shaft 98 which, in turn, through worm 96 and worm gear 94 drives cam plate 88, as previously described with reference to FIGURE 10. By a suitable selection of change gears 278 and 280 it is then possible to rotate cam plate 88 in a certain relation to the speed of the main spindle 50 and thereby to attain the desired ratio to the number of grooves of the workpiece. Thus, if ten chip grooves are to be provided in the workpiece, cam plate 88 would have to carry out ten revolutions at each revolution of the main spindle 50.

Figure 20:
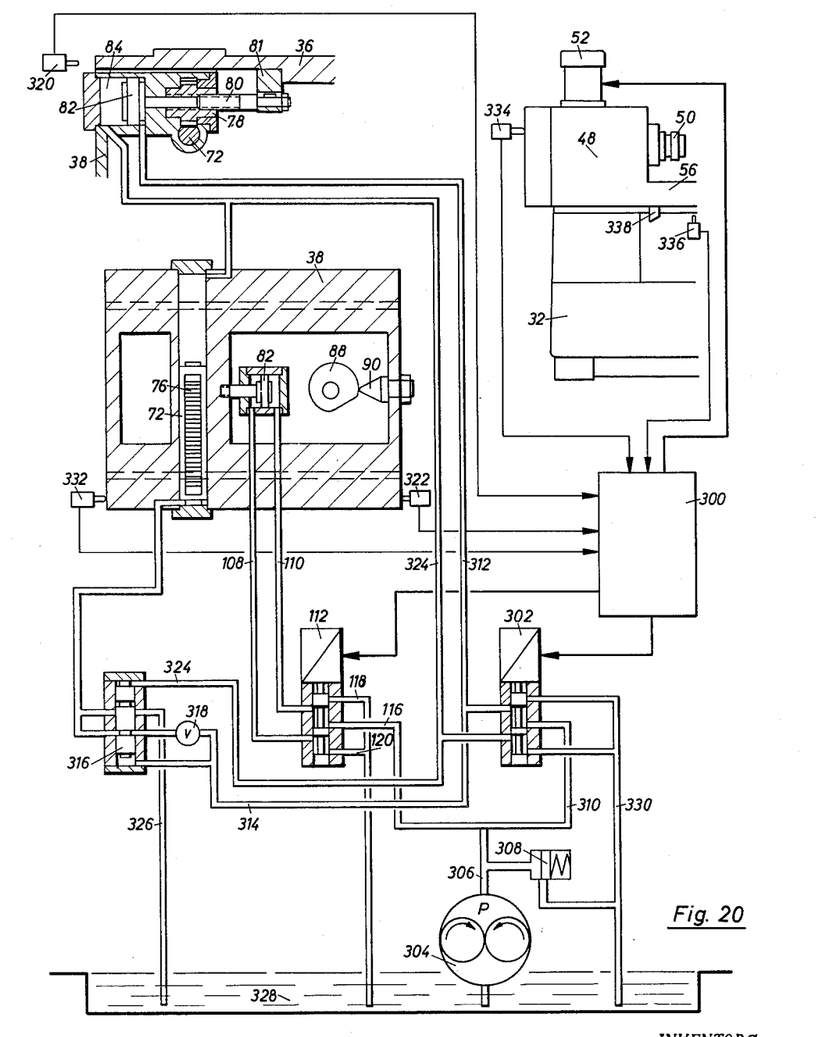
FIGURE 20 shows a diagram illustrating the functions of the hydraulic and electric system of the machine.

FIGURE 20 finally illustrates the functions of the hydraulic and electric system of the machine.

The first control step to be carried out on the central electric control board 300 consists in starting the magnetic slide valves 112 and 302, so as to move them to or hold them in their lowest position. The oil pressure generated by gear pump 304 then passes from this pump through line 306, relief pressure valve 308, and lines 116 and 310 to the magnetic slide valves 112 and 302. Slide valve 302 passes the oil pressure through line 312 directly to the chamber of cylinder 84 at the right side of piston 82, and through line 314 to the auxiliary slide valve 316 and thereby moves the latter to its upper position. Control valve 318 is provided for manually regulating the volume of the oil flow and thus for controlling the speed of piston 72, as also shown in FIGURES 10 and 11, which by its rack teeth 76 drives gear 78 which then rotates about worm spindle 80 and thereby shifts the latter for a short distance. Piston 82 is at this time held under pressure so that no play between worm spindle 80 and gear 78 can occur. Since worm spindle 80 is secured to bearing 81 which is secured to the lower side of the upper slide 36, spindle 80 draws the upper slide 36 toward the left until piston 82 arrives in its most forward position in which slide 36 engages with and actuates a limit switch 320 whereby an electric control impulse is given to control board 300 which then automatically switches on motor 52 whereby, as also shown in FIGURE 19, the main spindle 50 and lead spindle 234, as well as cam plate 88 will be rotated until cam plate 88 has reached its highest point on control pin 90. The lower slide 38 has thereby also moved as far as possible toward the right and has actuated a limit switch 322 which gives a control impulse to control board 300. Control board 300 then automatically reverses the position of slide valve 302 and moves it to its upper position, whereby the flow of the oil current is changed to line 324 so that the left side of cylinder 84 containing piston 82 is charged with pressure. By the pressure in line 324, the auxiliary slide valve 316 is at the same time pushed downwardly and piston 72 is moved back to produce the retracting movement of the upper slide 36. The oil from piston 72 then returns through line 326 directly into the oil sump rather than via control valve 318, line 314, slide valve 302, and line 330. As already mentioned, due to the return movement of piston 72, the upper slide 36 is likewise moved toward the right. During this movement, cam plate 88 rotates along control pin 90 until it arrives at its lowest point, whereby the lower slide engages with and actuates limit switch 332 which then sends a control impulse to control board 300. The latter then automatically switches off motor 52 whereupon the same sequence of operations is automatically repeated as stated above until work slide 56 and housing 48 engage with and actuate limit switch 334 which then sends a control impulse to control board 300 to shift slide 56 back in quick-return traverse. Slide valve 112 is then moved to its upper position so that the oil current passes through line 108. Piston 82 then pulls the lower slide 38 toward the right so that control pin 90 no longer engages with cam plate 88. Slide 38 then pushes the contact arm of limit switch 334 further inwardly than at the engagement at the highest point of cam plate 88, whereby a second contact in switch 322 will be closed to send another control impulse to control board 300 to reverse motor 52 to shift slide 56 back to its original position in quick-traverse. During this time, cam plate 88 can rotate freely until limit switch 336 is engaged by a cam 338 which is mounted on slide 56, whereby control board 300 automatically switches off the entire machine.

Although in the foregoing description it is assumed that the relief-shaping method is carried out by first plunge-cutting the stationary workpiece to the deepest point of the curved surface to be produced so as to remove by this quick operation the greatest amount of the material which has to be removed during the entire shaping or milling operation in order to produce the desired curved surface, and by then rotating the workpiece and simultaneously retracting the shaping or milling tool so as to remove the remainder of the material which has to be removed to attain the desired surface, it is, of course, also possible—although considerably less advantageous—to omit the plunge-cutting step and to proceed in the reverse order by starting to cut the curved surface from the highest point thereof and proceeding toward the lowest point.

Instead of repeating the relieving operation from the lowest to the highest point of a curved surface which has been cut in a previous roughing operation according to the method of the invention in order to finish the desired surface, it is also possible to carry out this second run from the highest to the lowest point of the curved surface.

Thus, for example, when producing a cutter with only one tooth, it is possible to rough-cut this tooth by the present method by first shaping or milling the tooth from the lowest to the highest point thereof and by then reversing the operation of the machine so as to fine-cut the tooth in a second run from the highest to the lowest point.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A method for relieving a workpiece having at least one recess in its peripheral surface, comprising the steps of advancing a cutting tool toward said workpiece from a plane spaced from said workpiece and, while said workpiece is held in a stationary position, cutting off at least a part of one wall of said recess, slowly rotating said workpiece about its axis, quickly reciprocating said cutting tool substantially tangentially to the desired surface of said workpiece and in cutting engagement therewith, and simultaneously retracting said cutting tool at a speed in a certain relation to the speed of rotation of said workpiece so as to cut a surface at least generally of an increasing curvature on said workpiece.

2. A method as defined in claim 1, in which said retracting movement of said reciprocating cutting tool is continuous and of an equal speed.

3. A method as defined in claim 1, in which said retracting movement of said reciprocating cutting tool is continuous and of an increasing speed.

4. A method as defined in claim 1, in which said rotary movement of said workpiece is continuous and of an equal speed, said retracting movement of said reciprocating tool being continuous and of an equal speed.

5. A method as defined in claim 1, in which said rotary movement of said workpiece is continuous and of an equal speed, said retracting movement of said reciprocating tool being continuous and of an increasing speed.

6. A method as defined in claim 1, further comprising the step of moving said workpiece in a substantially axial direction thereof while rotating the same about its axis and while retracting said cutting tool so as to cut a substantially helically curved surface on said workpiece.

7. A method as defined in claim 6, further comprising the step of quickly reversing the movement of said workpiece in said axial direction after said substantially helical surface has been cut while rotating said workpiece to return said workpiece to the starting position of the first rotary movement, and then advancing said cutting tool toward said workpiece to a point slightly closer to the axis of said workpiece than the point at which the first retracting movement was started, and then repeating said steps of rotating said workpiece and simultaneously moving it in a substantially axial direction thereof while retracting said reciprocating cutting tool.

8. A method as defined in claim 1, in which said workpiece has a plurality of recesses in its peripheral surface, said steps being performed continuously by first advancing said reciprocating cutting tool toward said stationary workpiece so as to cut off at least a part of one wall of one of said recesses, then starting said rotation of said workpiece and simultaneously retracting said cutting tool so as to cut a curved surface intermediate two adjacent recesses, then at the highest part of said curved surface stopping the retracting movement of said cutting tool, and repeating said steps until a curved surface is cut intermediate each pair of adjacent recesses by first stopping the rotation of said workpiece when said workpiece has turned to the proper position in which said cutting tool is again advanced to cut off at least a part of one wall of the next recess.

9. A method of relieving a workpiece comprising the steps of rotating a workpiece having at least one recess in its peripheral surface, advancing a cutting tool to a position within said recess from a plane spaced from said workpiece, moving said cutting tool at a high cutting speed and simultaneously rotating said workpiece in one direction and slowly retracting said cutting tool so as to cut a surface on said workpiece at least generally of an increasing curvature.

10. A relieving shaper for cutting a workpiece, especially a workpiece having at least one recess in its peripheral surface, comprising a cutting tool, means for reciprocating said cutting tool in a direction substantially tangentially to the peripheral surface of said workpiece and in cutting engagement therewith, means for holding a workpiece, means for rotating said workholding means about an axis extending at an angle to the direction of reciprocation of said cutting tool, means for advancing said cutting tool toward said workpiece from a plane spaced from said workpiece and for thereby cutting off at least a part of one wall of said recess while said workholding means and said workpiece thereon are in a stationary position, control means for starting the rotation of said work-rotating means and for simultaneously retracting said cutting tool at a speed in a certain relation to the speed of rotation of said workpiece so as to cut a surface at least generally of an increasing curvature on said workpiece.

11. A relieving shaper as defined in claim 10, further comprising means for moving said work-holding means in a substantially axial direction thereof while rotating the same about its axis and while said cutting tool is being retracted, so as to cut a substantially helical surface on said workpiece.

12. A relieving shaper as defined in claim 11, further comprising means for quickly reversing the movement of said work-holding means in said axial direction after said helical surface has been cut and while said workpiece is rotating to return said workpiece to the starting position, control means for starting said advancing means to advance said cutting tool toward said workpiece to a point slightly closer to the axis of said workpiece than the point at which the first retracting movement was started and for then repeating said steps of rotating said work-holding means and simultaneously moving the same in a substantially axial direction thereof while retracting said reciprocating tool.

13. A relieving shaper as defined in claim 10, wherein said means for advancing said cutting tool include a compound slide having a lower slide and an upper slide guidable upon said lower slide.

14. A relieving shaper as defined in claim 10, wherein said control means include cam means operatively connected to said means for advancing said cutting tool, work slide drive means, and differential means for varying the speed ratio between said work slide drive means and said cam means.

15. A relieving shaper comprising a frame, a work slide, means for guiding said work slide in a straight direction on said frame, means for driving said work slide in said direction, a gear housing on said work slide, a work spindle rotatably mounted within said gear housing, means on said work spindle for mounting a workpiece thereon, a compound slide, means for mounting said compound slide on said frame and for adjusting said compound slide on said frame so as to extend at different angles to the direction of said work slide and within a plane parallel to the plane of movement of said work slide, said compound slide comprising a lower slide and means for guiding said lower slide on said frame, and an upper slide and means for guiding the same on said lower slide, a second housing, means for mounting said second housing on said upper slide and for adjusting the same so as to extend at different angles to said work slide within a plane parallel to the plane of movement of said work slide, driving means within said second housing, eccentric means rotatably mounted within said second housing, means for connecting said driving means to said eccentric means for driving the same, a tool slide, means for guiding said tool slide along said second housing for a reciprocating movement in a substantially straight direction, means for connecting said tool slide to said eccentric means to be reciprocated thereby, a cutting tool, means for securing said cutting tool to said tool slide, means for connecting said tool-slide guiding means to said second housing and for rotatably adjusting the same about said eccentric means and within a plane vertical thereto, means for moving said lower slide in a straight direction, said last means comprising a cam plate, means for rotatably mounting said cam plate on said mounting means of said compound slide, and means for engaging said lower slide with said cam plate and for disengaging the same therefrom, means guided within said lower slide for moving said upper slide in the same direction but independently from said lower slide, gear means in said gear housing connected to said cam plate, to said work-slide driving means, and to said work spindle for driving the same, and driving means for driving said gear means.

16. A relieving shaper as defined in claim 15, in which said means for securing said cutting tool to said tool slide comprise a hinged member pivotably mounted near one end thereof on said tool slide about an axis extending at a right angle to the direction of said reciprocating movement of said tool slide, means connected to said eccentric means for pivoting said hinged member in the direction toward a workpiece on said work spindle during the part of said reciprocating movement of said tool slide in one direction, said part forming the cutting movement, and for pivoting said hinged member in the opposite direction during the other part of the movement of said tool slide in the other direction forming the non-cutting movement for preventing said cutting tool from engaging with the workpiece during said non-cutting movement.

17. A relieving shaper as defined in claim 15, in which said gear means comprise removable change gears for varying the speed ratio between said work spindle and said cam plate, and between said work spindle and said work-slide driving means, and differential means for varying the speed ratio between said work slide driving means and said cam plate, control means for engaging and disengaging said differential means, and brake means for stopping the rotation of one of the gears for changing the speed ratio between said work spindle and said cam plate when said control means are in the disengaging position.

18. A relieving shaper as defined in claim 15, further comprising a milling unit on said second housing, means for connecting said driving means to said milling unit for driving the same, means on said housing for adjusting said milling unit in a direction vertical to the plane of movement of said work slide, and means connected to said last adjusting means for adjusting said milling unit about an axis extending parallel to said plane.

19. A relieving shaper comprising a cutting tool, means for holding a workpiece, means for rotating said work-holding means, means for reciprocating said cutting tool in a direction substantially tangentially to the peripheral surface of said workpiece and in cutting engagement therewith, said means for rotating said work-holding means being free of driving connection to said means for reciprocating said cutting tool, said reciprocating means being adapted to move said cutting tool within a single plane, fixed with respect to said workpiece said rotating means being adapted to rotate said work-holding means about an axis at an angle to said plane, additional control means for stopping the rotation of said work-rotating means, control means for starting and stopping the movement of said advancing means, and central control means for controlling the operation of all of said control means in a predetermined sequence and for repeating said sequence until all of the desired curved surfaces have been cut on a workpiece during one revolution thereof.

20. A relieving shaper as defined in claim 19, further comprising means operative at a repeated revolution of said work-holding means when said wall part of each of a plurality of curved surfaces has once been cut off for infeeding said cutting tool for a short distance beyond the distance attained by said advancing means, means for continuously rotating said work-holding means during said repeated revolution, said central control means being further adapted to control all of said functions continuously and for stopping said entire machine at the completion of the workpiece.

21. A method for relieving a workpiece, comprising the steps of plunge cutting a reciprocating cutting tool into the workpiece to a depth corresponding to the deepest point of the surface of the product to be formed, slowly rotating said workpiece, reciprocating said cutting tool substantially tangentially to the desired surface, and gradually retracting the reciprocating cutting tool in correlation with the speed of rotation of said workpiece.

22. A method as defined in claim 21, further comprising moving said workpiece in a substantially axial direction during rotation thereof and while retracting said cutting tool.

23. A method of relieving a workpiece, comprising the steps of quickly reciprocating a cutting tool substantially tangentially to the peripheral surface of said workpiece and in cutting engagement therewith and simultaneously slowly rotating said workpiece about its axis, said workpiece having at least one reces in its peripheral surface, further comprising the steps of first advancing said cutting tool to a position within said recess in which said cutting tool when reciprocating has sufficient clearance for its movement, said reciprocating movement being greater than the width of said recess as seen under the direction of said movement, and then starting said rotation of said workpiece and simultaneously retracting said cutting tool at a speed in a certain relation to the speed of rotation of said workpiece so as to cut a surface at least generally of an increasing curvature on said workpiece.

References Cited in the file of this patent
UNITED STATES PATENTS

| | | |
|---|---|---|
| 1,355,780 | Richards | Oct. 12, 1920 |
| 2,318,305 | Groene | May 4, 1943 |
| 2,405,159 | Miller | Aug. 6, 1946 |
| 2,408,876 | Pigott | Oct. 8, 1946 |
| 2,495,927 | Francis | Jan. 31, 1950 |
| 2,524,091 | Von Zimmerman | Oct. 3, 1950 |
| 2,549,324 | Miller | Apr. 17, 1951 |
| 2,776,604 | Simsack | Jan. 8, 1957 |
| 2,823,445 | Lyons | Feb. 18, 1958 |

FOREIGN PATENTS

| | | |
|---|---|---|
| 110,788 | Great Britain | Oct. 30, 1917 |
| 123,890 | Great Britain | Mar. 13, 1919 |